United States Patent
Gillespie et al.

(10) Patent No.: US 9,830,078 B2
(45) Date of Patent: *Nov. 28, 2017

(54) SYSTEM AND METHOD FOR PRE-OPERATING SYSTEM MEMORY MAP MANAGEMENT TO MINIMIZE OPERATING SYSTEM FAILURES

(71) Applicant: Dell Products, LP, Round Rock, TX (US)

(72) Inventors: Kurt D. Gillespie, Pflugerville, TX (US); Gregory S. Hudgins, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,022

(22) Filed: Oct. 30, 2015

(65) Prior Publication Data

US 2016/0054926 A1  Feb. 25, 2016

Related U.S. Application Data

(63) Continuation of application No. 13/853,553, filed on Mar. 29, 2013, now Pat. No. 9,201,662.

(51) Int. Cl.
*G06F 9/45* (2006.01)
*G06F 12/0808* (2016.01)
*G06F 12/0815* (2016.01)
*G06F 3/06* (2006.01)
*G06F 9/44* (2006.01)

(52) U.S. Cl.
CPC .......... *G06F 3/0604* (2013.01); *G06F 3/0631* (2013.01); *G06F 3/0673* (2013.01); *G06F 9/4418* (2013.01)

(58) Field of Classification Search
CPC ........ G06F 9/4406; G06F 8/65; G06F 9/4401; G06F 19/3406; G06F 21/566; G06F 21/56; G06F 21/575; G06F 8/60; G06F 9/4418; G06F 12/023; G06F 11/0769; G06F 11/1068; G06F 11/1417; G06F 11/1438
USPC ........................................................ 711/154
See application file for complete search history.

(56) References Cited

U.S. PATENT DOCUMENTS

| | | | |
|---|---|---|---|
| 5,708,850 A | 1/1998 | Staros | |
| 6,782,410 B1 * | 8/2004 | Bhagat | G06F 9/5027 709/201 |
| 6,842,377 B2 * | 1/2005 | Takano | G11C 7/1021 365/185.21 |

(Continued)

*Primary Examiner* — Yaima Rigol
*Assistant Examiner* — Mohamed Gebril
(74) *Attorney, Agent, or Firm* — Larson Newman, LLP

(57) ABSTRACT

A method includes booting an information handling system, providing by an EFI of the information handling system a memory segment for a first EFI type memory access, reserving a first portion of the segment from access by an operating system of the information handling system, determining a size of the first portion, determining a size of a second portion of the segment based upon the size of the first portion, allocating a third portion of the segment for the first EFI type memory access, the third portion including the first portion and the second portion, and passing a memory map to the operating system, the memory map including the third portion, wherein the third portion is reserved from access by the operating system.

14 Claims, 5 Drawing Sheets

(56) References Cited

U.S. PATENT DOCUMENTS

| | | | |
|---|---|---|---|
| 6,889,340 B1* | 5/2005 | Bramley, Jr. | G06F 11/2284 714/30 |
| 7,017,011 B2* | 3/2006 | Lesmanne | G06F 12/082 711/141 |
| 7,196,942 B2* | 3/2007 | Khurana | G11C 7/1051 326/38 |
| 7,269,715 B2* | 9/2007 | Le | G06F 9/3802 712/215 |
| 7,321,955 B2* | 1/2008 | Ohmura | G06F 12/0804 711/113 |
| 7,512,736 B1* | 3/2009 | Overby | G06F 3/0607 707/999.202 |
| 7,548,982 B2 | 6/2009 | Gu et al. | |
| 7,565,563 B2 | 7/2009 | Gappisch et al. | |
| 7,716,332 B1 | 5/2010 | Topfl et al. | |
| 8,200,992 B2 | 6/2012 | Felch et al. | |
| 8,230,193 B2* | 7/2012 | Klemm | G06F 3/0608 711/114 |
| 8,244,959 B2 | 8/2012 | Fusella et al. | |
| 8,341,501 B2 | 12/2012 | Franceshini et al. | |
| 8,504,411 B1 | 8/2013 | Subasic et al. | |
| 8,566,546 B1* | 10/2013 | Marshak | G06F 3/0604 711/112 |
| 8,676,741 B2 | 3/2014 | Ulinski et al. | |
| 8,862,930 B2* | 10/2014 | Horman | G06F 11/1415 711/150 |
| 8,990,527 B1* | 3/2015 | Linstead | G06F 3/0617 711/161 |
| 2004/0068621 A1* | 4/2004 | Van Doren | G06F 12/0828 711/144 |
| 2004/0128618 A1 | 7/2004 | Datta | |
| 2005/0125607 A1* | 6/2005 | Chefalas | G06F 12/0862 711/113 |
| 2006/0123223 A1 | 6/2006 | Mayfield et al. | |
| 2006/0202999 A1* | 9/2006 | Thornton | G06F 12/145 345/531 |
| 2007/0008328 A1* | 1/2007 | MacWilliams | G06F 12/0646 345/530 |
| 2008/0148065 A1* | 6/2008 | Westerinen | G06F 21/554 713/189 |
| 2008/0288863 A1 | 11/2008 | Bohannon | |
| 2009/0094413 A1* | 4/2009 | Lehr | G06F 3/0605 711/112 |
| 2009/0228648 A1* | 9/2009 | Wack | G06F 11/1092 711/114 |
| 2009/0249053 A1* | 10/2009 | Zimmer | G06F 21/575 713/2 |
| 2009/0282101 A1* | 11/2009 | Lim | G06F 9/5077 709/203 |
| 2010/0046267 A1* | 2/2010 | Yan | G11C 16/24 365/51 |
| 2010/0050016 A1* | 2/2010 | Franklin | G06F 11/0727 714/6.32 |
| 2010/0125712 A1* | 5/2010 | Murase | G06F 11/1458 711/162 |
| 2010/0241785 A1* | 9/2010 | Chen | G06F 9/5016 711/6 |
| 2010/0313061 A1* | 12/2010 | Huth | G06F 11/073 714/2 |
| 2010/0332780 A1* | 12/2010 | Furuya | G06F 3/0689 711/162 |
| 2011/0010503 A1 | 1/2011 | Yamamura et al. | |
| 2011/0023106 A1 | 1/2011 | Murotake et al. | |
| 2011/0145486 A1 | 6/2011 | Owa et al. | |
| 2011/0202735 A1* | 8/2011 | Kono | G06F 11/1451 711/162 |
| 2011/0307745 A1* | 12/2011 | McCune | G06F 17/30221 714/54 |
| 2012/0047317 A1 | 2/2012 | Yoon et al. | |
| 2012/0110293 A1* | 5/2012 | Yang | G06F 9/45558 711/170 |
| 2012/0198107 A1* | 8/2012 | McKean | G06F 13/18 710/40 |
| 2013/0007373 A1* | 1/2013 | Beckmann | G06F 12/126 711/136 |
| 2013/0031374 A1* | 1/2013 | Thom | G06F 21/57 713/189 |
| 2013/0067161 A1* | 3/2013 | Chandra | G06F 13/12 711/114 |
| 2013/0080805 A1* | 3/2013 | Vick | G06F 8/4432 713/320 |
| 2013/0086302 A1 | 4/2013 | Tressler et al. | |
| 2013/0111129 A1* | 5/2013 | Maki | G06F 3/0611 711/117 |
| 2013/0152097 A1* | 6/2013 | Boctor | G06F 9/505 718/103 |
| 2013/0326270 A1* | 12/2013 | Chen | G06F 11/2089 714/6.21 |
| 2014/0003114 A1* | 1/2014 | Pellizzer | H01L 27/2481 365/63 |

* cited by examiner

SYSTEM AND METHOD FOR PRE-OPERATING SYSTEM MEMORY MAP MANAGEMENT TO MINIMIZE OPERATING SYSTEM FAILURES

CROSS REFERENCE TO RELATED APPLICATIONS

This application is a continuation of U.S. patent application Ser. No. 13/853,553, entitled "System and Method for Pre-Operating System Memory Map Management to Minimize Operating System Failures," filed on Mar. 29, 2013, the disclosure of which is hereby expressly incorporated by reference in its entirety.

FIELD OF THE DISCLOSURE

This disclosure relates generally information handling systems, and more particularly relates to pre-operating system memory map management to minimize operating system failures.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
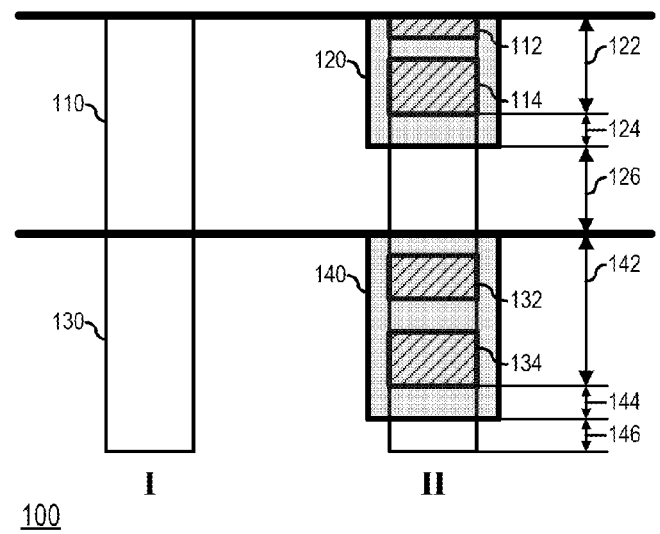
FIGS. 1-4 illustrate memory maps of an information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-4 illustrate memory maps 100, 200, 300, and 400 of an information handling system. In particular, each of memory maps 100, 200 300, and 400 illustrate the status of one or more sections of a memory associated with an information handling system at various times during a pre-operating system (pre-OS) boot procedure for the information handling system. The various times are denoted in the figures by the use of Roman numerals (e.g., I, II, III, etc.) For each of memory maps 100, 200, 300, and 400, a top of a memory segment is illustrated by a heavy line, and memory storage in each segment is allocated downward into the segment. The skilled artisan will recognize that the top of the memory can be representative of a base memory address, that the memory segment represents a range of memory addresses starting at the base memory address, and that allocations into the memory segment can be represented as offsets from the base memory address. The base memory addresses can represent low physical memory addresses with the offsets pointing to higher physical memory addresses, or the base memory addresses can represent high physical memory addresses with the offsets pointing to lower physical memory addresses, as needed or desired.

Memory maps 100, 200, 300, and 400 each include one or more memory sections. The memory sections represent segments of a memory of an information handling system that are each reserved for a particular memory type. For example, a memory type can include a unified extensible firmware interface (UEFI) memory type, such as loader code, loader data, boot service code, boot service data, runtime services code, runtime services data, ACPI table data, ACPI firmware code, memory mapped input/output (I/O) virtual address space, memory mapped I/O port space, another memory type, or a combination thereof. In a particular embodiment, one or more of the memory sections is reserved for the duration of a pre-OS phase of operation of the information handling system, but is made available for the use of the OS after the handoff of operation from the pre-OS code to the OS code is completed. In another embodiment, one or more of the memory sections remain reserved and unavailable to the OS after the handoff. For example, one or more of the memory sections can be reserved for the use of a basic input/output system (BIOS) or UEFI of the information handling system after the handoff of operation from the pre-OS code to the OS code is completed.

FIG. 1 illustrates a memory map 100 of an information handling system, including memory sections 110 and 130. At time I, the partitioning of memory sections 110 and 130 for their respective memory types has been made, but no allocations to the memory sections have been made. In a particular embodiment, each memory type identified by the UEFI is associated with a different memory section, similar to memory sections 110 and 130. At time II, the pre-OS phase of operation of the information handling system has completed, and several allocations of memory sections 110 and 130 have been reserved as unavailable to the OS after the handoff of operation to the OS code. Here, memory portions 112 and 114 are reserved in memory section 110, and memory portions 132 and 134 are reserved in memory section 130. The skilled artisan will recognize that, if the boot process of the information handling system that is represented by memory map 100 is in response to a wake event from a previous hibernation or sleep event of the information handling system, then the locations of reserved memory portions 112, 114, 132, and 134 may have changed from their locations prior to the hibernation or sleep event. As such, reserving only memory portions 112 and 114 in memory section 110 and memory portions 132 and 134 in memory section 130 may result in memory conflicts between the pre-OS reserved memory locations, and the memory locations that are reallocated, expected to be unallocated, or expected to be already owned by the OS upon resumption from the hibernation or sleep event. Such memory conflicts involving the OS using or overwriting memory that is already in use, and that is critical to the pre-OS for maintaining a stable system, can lead to catastrophic failure of the OS, resulting in, for example, a "blue screen of death" and a halt of execution of the OS.

To mitigate the potential for catastrophic failures upon resuming from a hibernation or a sleep event, instead of merely reporting that memory portions 112, 114, 132, and 142 are reserved, the pre-OS agent, such as a BIOS or UEFI of the information handling system, operates to allocate larger portions of memory sections 110 and 130 as reserved memory portions. Here, the pre-OS agent indicates that an allocated memory portion 120 is reserved in memory section 110, and that an allocated memory portion 140 is reserved in memory section 130. Allocated memory portion 120 includes a utilized memory portion 122 that includes reserved memory portions 112, 114, and the unallocated memory between them, and a buffer memory portion 124 that extends beyond the bottom of the utilized memory portion, permitting a degree of changeability in the location of the reserved memory portions inside allocated memory portion 120 between different boot instances on the information handling system. Similarly, allocated memory portion 140 includes a utilized memory portion 142 that includes reserved memory portions 132 and 134, and a buffer memory portion 144 that extends beyond the bottom of the utilized memory portion, and that permits a further degree of changeability in the location of the reserved memory portions inside memory portion 140. Here, after handing off the operation of the information handling system from the pre-OS code to the OS code, the OS has an available memory portion 126 of memory section 110, and an available memory portion 146 in memory section 130 that are available for use by the OS. The skilled artisan will recognize that the total available memory to the OS can include memory sections 110 and 130, exclusively, or the memory sections can be only a portion of the memory available in the information handling system and that the information handling system can include a greater number or a lesser number of memory sections and memory portions. The skilled artisan will also recognize that gaps in the memory allocations between reserved memory portions 112 and 114, and between reserved memory portions 132 and 132 may be formed during the boot process, and that the gaps between the reserved memory portions are included in allocated memory portions 120 and 140.

In a particular embodiment, the pre-OS agent operates to specify the size of allocated memory portions 120 and 140. In another embodiment, the sizes of buffer memory portions 124 and 144 are given as a static minimum size for each memory type being managed. For example, the static minimum size of buffer memory portions 124 and 144 can be the same, such as 256 megabytes (MB), 512 MB, 1 gigabyte (GB), or another size, as needed or desired. In another example, the static minimum size for buffer memory portion 124 can be different than the static minimum size for buffer memory portion 144. In another embodiment, the total sizes of allocated memory portions 120 and 140 are specified by the pre-OS agent by first determining the sizes of utilized memory portions 122 and 142, and then determining the sizes of buffer memory portions 124 and 144 as a calculated percentage of the current sizes of the utilized memory portions. In a particular embodiment, the percentage applied to determine both of allocated memory portions 120 and 140 can be the same percentage. For example, the size of buffer memory portions 124 and 144 can be determine to be 50% of the size of their associated utilized memory portions. Here, if utilized memory portion 122 is 100 MB, then buffer memory portion 124 will be 50 MB and allocated memory portion 120 will be 150 MB, and if utilized memory portion 142 is 200 MB, then buffer memory portion 144 will be 100 MB and allocated memory portion 140 will be 300 MB. In another embodiment, the percentage applied to determine both of allocated memory portions 120 and 140 can be the different percentages. In another embodiment, the sizes of allocated memory portions 120 and 140 are given as the larger of a minimum size for each portion, and a calculated portion size specified by the pre-OS agent as described above. In a particular embodiment, the sizes of allocated memory portions 120 and 140, as determined above, may end on boundaries that are not associated with a valid memory allocation unit, such as a page or block boundary. For example, a static size or a calculated size can include a part of a memory page or block. Here, the sizes of the allocated memory portions 120 and 140 can be rounded up or down to a page or block boundary.

In a particular embodiment, the pre-OS agent operates to safely reconfigure allocated memory portions, prior to handing off the operation of the information handling system to the OS, when the information handling system detects that the OS did not save the previous mapping or data during a previous boot. For example, when a previous shut down of the OS occurs without storing the memory map state for the information handling system, then in a subsequent boot of the information handling system, the pre-OS agent is free to allocate memory portions as needed or desired in any size or location, and the OS will operate by allocating memory around the memory map provided by the pre-OS agent.

Figure 2:
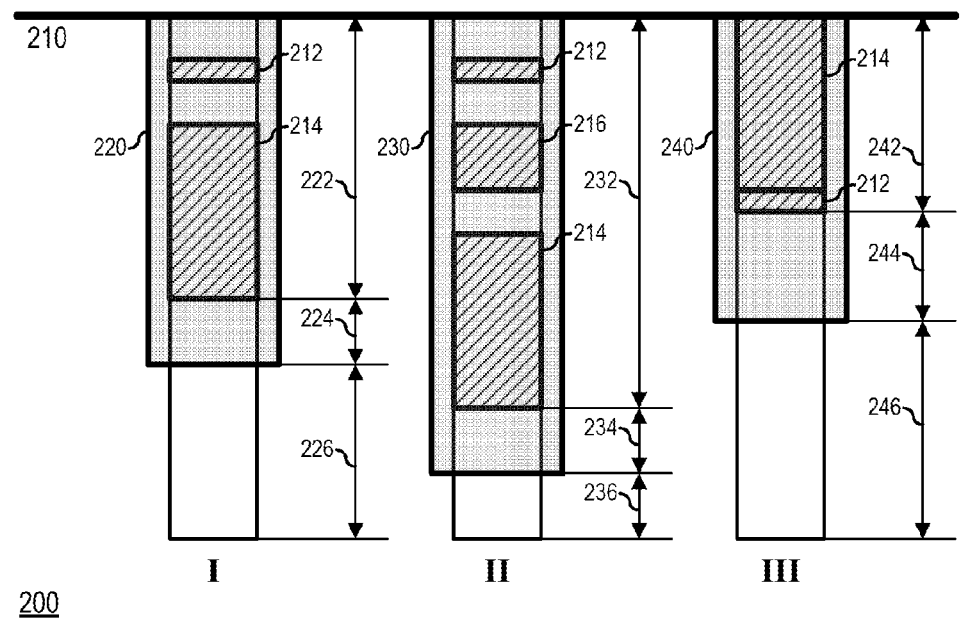

FIG. 2 illustrates a memory map 200 of the information handling system, including a memory section 210, where the pre-OS agent is free to reconfigure allocated memory portions between boots of the information handling system. At time I, the pre-OS phase of operation of the information handling system has completed, and an allocation of memory section 210 has been reserved as unavailable to the OS after the handoff of operation to the OS code. Here, memory portions 212 and 214 are reserved in memory section 210, and the pre-OS agent indicates that an allocated memory portion 220 is reserved in the memory section. Allocated memory portion 220 includes a utilized memory portion 222 that includes reserved memory portions 212 and 214, and a calculated buffer memory portion 224. After handing off the operation of the information handling system to the OS code, the OS has an available memory portion 226.

At time II, a second pre-OS phase of operation associated with a safe reboot of the information handling system has completed, and a different allocation of memory section 210 has been reserved as unavailable to the OS after the handoff of operation to the OS code. In this instance, similar memory portions 212 and 214 are reserved in memory section 210, but because an added memory portion 216 is reserved in memory section 210, and the pre-OS agent indicates that a larger allocated memory portion 230 is reserved in the memory section. Allocated memory portion 230 includes a utilized memory portion 232 that includes reserved memory portions 212, 214, and 216, and a calculated buffer memory portion 234. After handing off the operation of the information handling system to the OS code, the OS has a smaller available memory portion 236. Finally, at time III, a third pre-OS phase of operation associated with a second safe reboot of the information handling system has completed, and yet another different allocation of memory section 210 has been reserved as unavailable to the OS after the handoff of operation to the OS code. Here, pre-OS operations related to reserved memory portions 212 and 214 may have been performed in a different order, thereby consolidating the memory map, such that a smaller allocated memory portion 240 is reserved in the memory section. Allocated memory portion 240 includes a utilized memory portion 242 that includes reserved memory portions 212 and 214, and a calculated buffer memory portion 244. After handing off the operation of the information handling system to the OS code, the OS has a larger available memory portion 246.

In a particular embodiment, the pre-OS agent detects that it is locked from reconfiguring or resizing allocated memory portions 120 and 140 when the information handling system is booted, prior to handing off operation to the OS. For example, when a previous shut down of the OS results in the storing of a memory map state from the information handling system for use in a subsequent boot of the OS, indicating the OS may be intolerant of changes to the memory map subsequent boots, the pre-OS memory allocation determined in the previous boot of the information handling system will be used as long as the current pre-OS allocations still fall within allocated memory portions 120 and 140.

In a particular embodiment, the pre-OS agent operates to determine when a catastrophic failure has resulted from a memory reservation conflict between a pre-OS allocated memory portion and the memory usage desired by the OS during a wake event from a previous hibernation or sleep event. If so, in the boot of the information handling system subsequent to the catastrophic failure, the pre-OS agent operates to increase the size of the associated buffer memory portion within which the memory conflict occurred. For example, if the pre-OS agent determines that it is operating in a mode where it is locked from reconfiguring or resizing the allocated memory portions reserved from the OS for pre-OS use and the current amount of memory reservation by the pre-OS has exceeded the previous boundary of the previous boot, the pre-OS agent can log the failure and add an additional amount to the size of the buffer memory portion, such as an additional 256 MB or another amount, as needed or desired. In another example, if the pre-OS agent determines that the OS was going to use a memory location within the pre-OS allocated memory portion and caused a catastrophic failure of the OS, the pre-OS agent can log the failure and add an additional percentage to the size of the buffer memory portion, such as an additional 50%. Here, using the example from FIG. 1, above, instead of allocating 300 MB for allocated memory portion 140, the pre-OS agent can allocate an additional 50% of the size of utilized memory portion 142, or an additional 100 MB, so that the allocated memory portion is 400 MB on the next boot of the information handling system.

Figure 3:
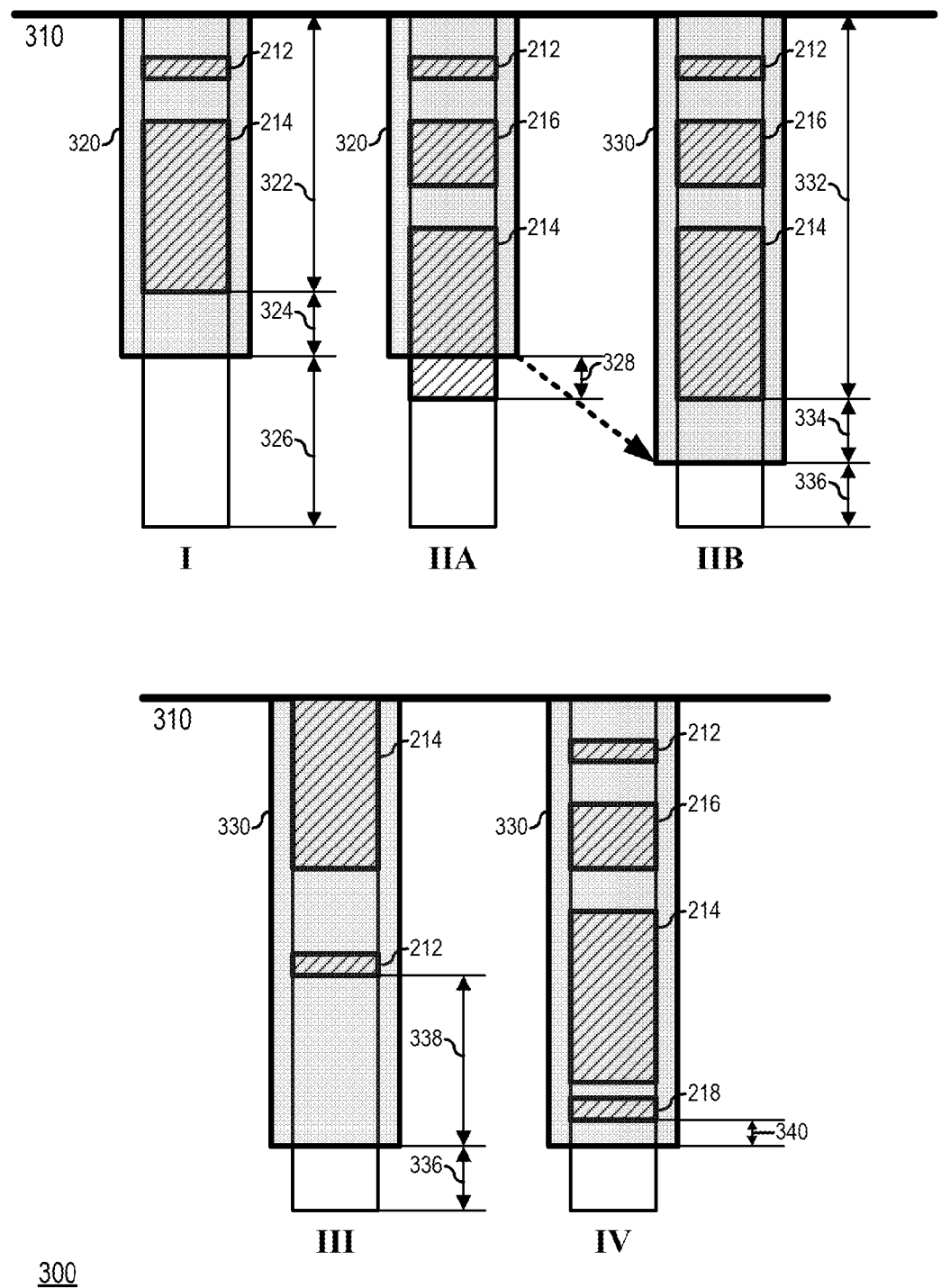

FIG. 3 illustrates a memory map 300 of the information handling system, including a memory section 310, where the pre-OS agent is not free to reconfigure allocated memory portions between boots of the information handling system. As illustrated, times I, II, and III reflect similar boot procedures as described in FIG. 2, As such, at time I, the pre-OS phase of operation of the information handling system has completed, and an allocation of memory section 310 has been reserved as unavailable to the OS after the handoff of operation to the OS code. Here, memory portions 212 and 214 are reserved in memory section 310, and the pre-OS agent indicates that an allocated memory portion 320 is reserved in the memory section. Allocated memory portion 320 includes a utilized memory portion 322 that includes reserved memory portions 212 and 214, and a buffer memory portion 324. After handing off the operation of the information handling system to the OS code, the OS has an available memory portion 328.

At time IIA, a second pre-OS phase of operation associated with a locked reboot of the information handling system has completed, and a different allocation of memory section 310 has been reserved as unavailable to the OS after the handoff of operation to the OS code. In this instance, allocated memory portion 320 is locked and the pre-OS agent tries not to expand the size of the allocated memory portion, knowing that a change in location or size can trigger a catastrophic OS failure. However, here, part of memory portion 214 is outside of allocated memory portion 320, so there is a potential for the OS to overwrite a memory portion 328 and cause a catastrophic failure of the OS. In response, the pre-OS agent will predetermine a new allocated memory portion 330, as shown at time IIB that assumes the same boot process as shown at time IIA, but that the resizing was done knowing that the failure is unavoidable already and that logging the failure and resizing will help to avoid the failure from happening in the future. Here, similar memory portions 212, 214, and 216 are reserved in memory section 310, and allocated memory portion 330 includes a utilized memory portion 332 and a buffer memory portion 334. Then, the next time there is a catastrophic failure, or there is a safe reboot, the memory allocation described by allocated memory portion 330 will be provided to the OS after the pre-OS agent hands off operation to the OS.

In another embodiment, the pre-OS agent operates to record a number of catastrophic failures that have occurred with a particular allocated memory portion, and to successively increase the size of the associated buffer memory portion with each successive boot. For example, a first failure may result in the pre-OS agent increasing the size of buffer memory portion 334 by 50%, a second failure may result in the pre-OS agent increasing the size of the buffer memory portion by 100%, and a third failure may result in the pre-OS agent increasing the size of the buffer memory portion by 200%, or by another percentage, as needed or desired. In a particular embodiment, the pre-OS agent maintains the record of numbers of catastrophic failures so as to maintain the size of allocated memory portion 330 at a size that is large enough to mitigate future catastrophic failures. Here, at time III, a third pre-OS phase of operation associated with a second locked reboot of the information handling system has completed, but allocated memory portion 330 is reserved as unavailable to the OS after the handoff of operation to the OS code. Here, pre-OS operations related to reserved memory portions 212 and 214 may have been performed in a different order, but because the boot is locked, the effective size of buffer portion 338 is larger, in order to accommodate the potentiality that the boot procedure mimics that of the boot at time II. Here, after handing off the operation of the information handling system to the OS code, the OS has an available memory portion 336.

Finally, at time IV, a fourth locked boot operation has completed, and yet another different allocation of memory section 310 has been created. Here, pre-OS operations related to reserved memory portions 212, 214, and 216, and a new reserved memory portion 218 may have been performed, but there are no parts of the reserved memory portions that are outside of allocated memory portion 330, so the fourth locked boot will not cause a catastrophic failure of the OS. Moreover, while the fourth locked boot results in a much smaller buffer memory portion 340, there is no need to recalculate the size of allocated memory portion 330.

Figure 4:
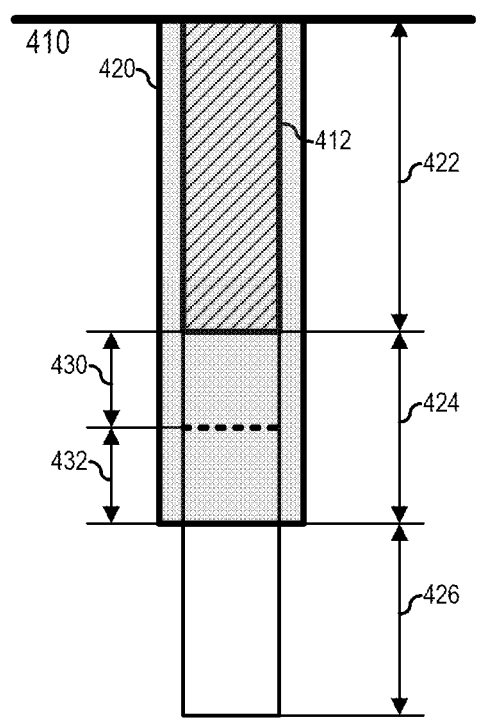

FIG. 4 illustrates a memory map 400 of the information handling system, including a memory section 410. An allocation of memory section 410 has been reserved as unavailable to the OS after the handoff of operation to the OS code. Here, memory portion 412 is reserved in memory section 410, and the pre-OS agent indicates that an allocated memory portion 420 is reserved in the memory section. Allocated memory portion 420 includes a utilized memory portion 422 that includes reserved memory portion 412, and a buffer memory portion 424. After handing off the operation of the information handling system to the OS code, the OS has an available memory portion 426. Buffer memory portion 424 includes a first buffer memory portion 430 and a second buffer memory portion 432. First buffer memory portion 430 represents a buffer memory portion, the size of which is determined either statically, or as a percentage of the size of reserved memory portion 412, as described above. Second buffer memory portion 432 represents an additional buffer region that is determined based upon a number of times that the OS has experienced a catastrophic failure associated with memory section 410. Here, the sizing of allocated memory portion 420 can change over time to account for OS failures, and thereby provide increasingly robust operation over time.

In a particular embodiment, the size of allocated memory portion 420 can grow linearly with the number of failures. Here, for example, the size of allocated memory portion 420 can be given as:

$$A = R + B_1 + B_2 = R + B_1 + (M*F) \quad \text{Equation 1:}$$

where A is the size of allocated memory portion 420, R is the size of reserved memory portion 412, $B_1$ is the size of first buffer memory portion 430, and $B_2$ is the size of buffer memory portion 432, M is a multiplier, and F is a failure count. In another embodiment, the size of allocated memory portion 420 can grow non-linearly with the number of failures. Here, for example, the size of allocated memory portion 420 can be given as:

$$A = R + B_1 + B_2 = R + B_1 + (M*F^E) \quad \text{Equation 2:}$$

where E is a constant exponential factor, where E is greater than one (1). In this case, a first failure is dealt with by making second buffer memory portion 432 relatively small, and the size is increased with each successive failure.

Figure 5:
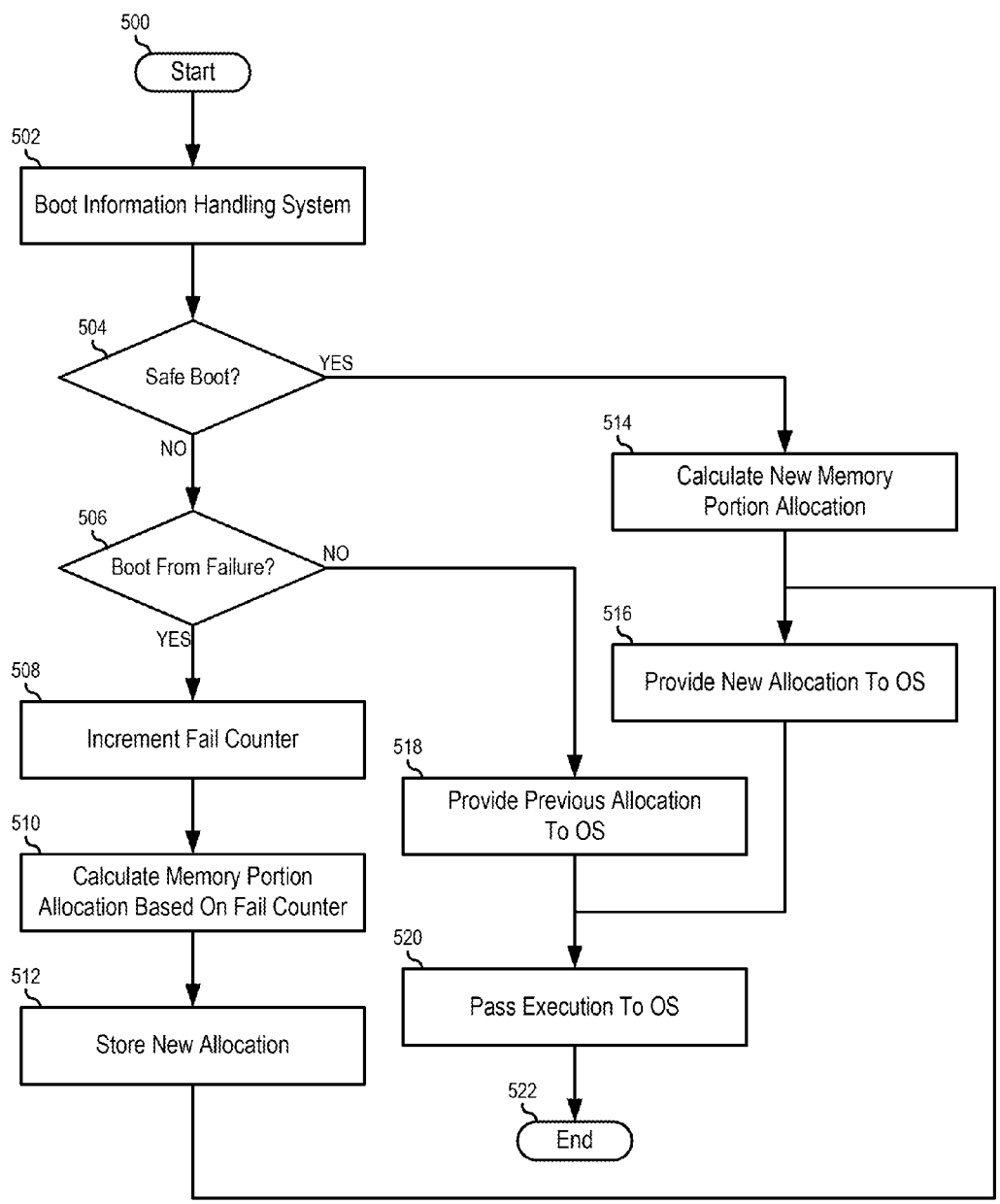
FIG. 5 is a flow chart illustrating a method for pre-operating system memory map management to minimize operating system failures according to an embodiment of the present disclosure.

FIG. 5 illustrates a method of pre-operating system memory map management to minimize operating system failures starting at block 500. An information handling system is booted in block 502. A decision is made as to whether or not the boot of the information handling system is a boot wherein it is safe to reallocate memory portions in decision block 504. If not, the "NO" branch of decision block 504 is taken, and a decision is made as to whether or not the boot of the information handling system is in response to a catastrophic failure of an OS of the information handling system based on a memory conflict between memory allocated to the OS and memory portions reserved for the use of a pre-OS agent of the information handling system in decision block 506. If so, the "YES" branch of decision block 506 is taken, and a fail counter is incremented by the pre-OS agent in block 508. An allocation of a memory portion is calculated based upon the fail counter in block 510, the new allocation is stored in block 512, the new allocation provided to the OS in block 516, the execution of code on the information handling system is passed to the OS in block 520, and the method ends in block 522.

If the boot of the information handling system is not in response to a catastrophic failure of the OS, the "NO" branch of decision block 506 is taken, a previous allocation of a memory portion is provided to the OS in block 518, the execution of code on the information handling system is passed to the OS in block 520, and the method ends in block 522. Returning to decision block 504, if the boot of the information handling system is a boot wherein it is safe to reallocate memory portions, the "YES" branch of decision block 504 is taken, a new allocation of the memory portion is calculated in block 514, the new allocation provided to the OS in block 516, the execution of code on the information handling system is passed to the OS in block 520, and the method ends in block 522.

Figure 6:
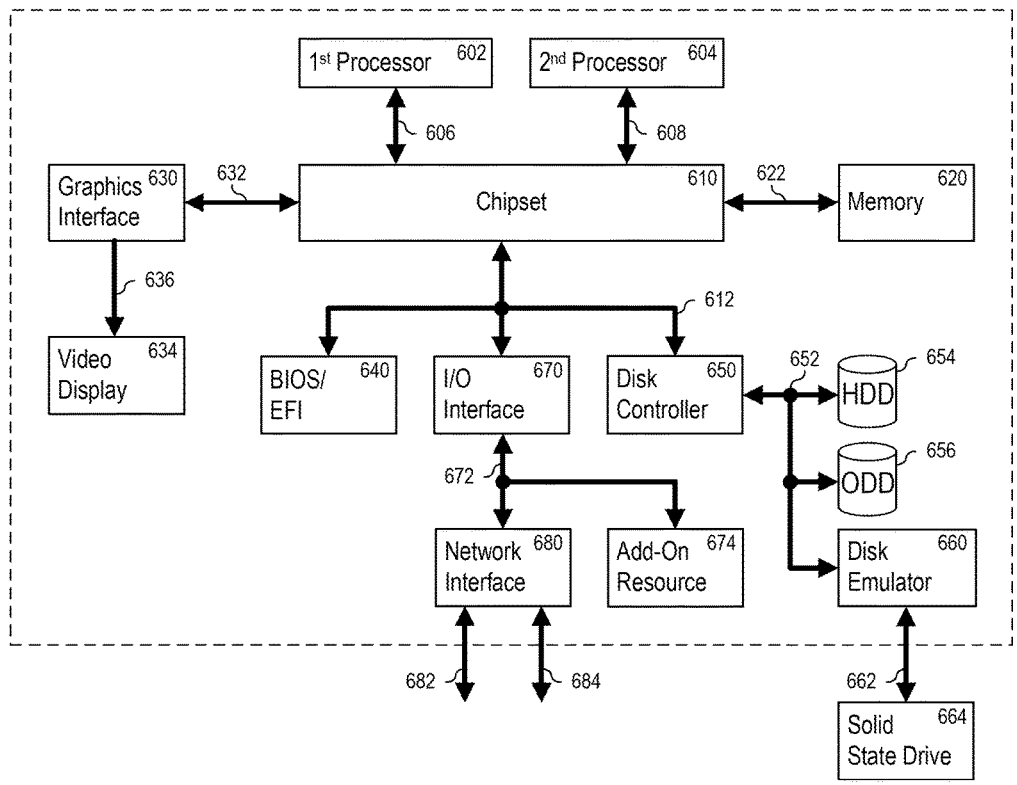
FIG. 6 is a block diagram illustrating a generalized information handling system according to an embodiment of the present disclosure.

FIG. 6 illustrates a generalized embodiment of an information handling system 600. For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 includes devices or modules that embody one or more of the devices or modules described above, and operates to perform one or more of the methods described above. Information handling system 600 includes a processors 602 and 604, a chipset 610, a memory 620, a graphics interface 630, include a basic input and output system/extensible firmware interface (BIOS/EFI) module 640, a disk controller 650, a disk emulator 660, an input/output (I/O) interface 670, and a network interface 680. Processor 602 is connected to chipset 610 via processor interface 606, and processor 604 is connected to the chipset via processor interface 608. Memory 620 is connected to chipset 610 via a memory bus 622. Graphics interface 630 is connected to chipset 610 via a graphics interface 632, and provides a video display output 636 to a video display 634. In a particular embodiment, information handling system 600 includes separate memories that are dedicated to each of processors 602 and 604 via separate memory interfaces. An example of memory 620 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 640, disk controller 650, and I/O interface 670 are connected to chipset 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 610 also includes one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/EFI module 640 includes BIOS/EFI code operable to detect resources within information handling system 600, to provide drivers for the resources, initialize the resources, and access the resources. BIOS/EFI module 640 includes code that operates to detect resources within information handling system 600, to provide drivers for the resources, to initialize the resources, and to access the resources.

In a particular embodiment, BIOS/EFI 640 performs pre-OS operations as described above. Here, BIOS/EFI 640 can receive an indication from an OS stored in memory 620, that a catastrophic failure has occurred. Further, BIOS?EFI 640 can determine if a particular boot of information handling system 600 is a boot wherein it is safe to reconfigure the allocated memory portions, or if the boot is one in which the allocated memory portions are locked, as described above.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive 664 to be coupled to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to an add-on resource 674 and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as chipset 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   booting an information handling system;
   providing, by an extensible firmware interface (EFI) of the information handling system, a segment of a memory of the information handling system for a first EFI type memory access;
   reserving a first portion of the segment at a first location in the segment, the first portion being reserved from access by an operating system (OS) of the information handling system, and being reserved for the use of a pre-OS agent of the EFI;
   determining a size of the first portion;

determining a size of a second portion of the segment based upon the size of the first portion;

allocating a third portion of the segment for the first EFI type memory access, the third portion including the first portion and the second portion;

passing a first memory map to the operating system, the first memory map including the third portion, wherein the third portion is reserved from access by the operating system;

rebooting the information handling system;

determining that in rebooting the information handling system, the allocation of the third portion is locked; and in response to determining that the allocation of the third portion is locked:

determining that the reboot of the information handling system is not in response to an operating system failure; and passing the first memory map to the operating system in response to determining that the reboot of the information handling system is not in response to an operating system failure; and determining that the reboot of the information handling system is in response to an operating system failure.

2. The method of claim 1, wherein, in response to rebooting the information handling system, the method further comprises:

determining that in rebooting the information handling system, it is safe to reallocate the third portion.

3. The method of claim 2, wherein determining that it is safe to reallocate the third portion is in response to determining that the reboot of the information handling system is a restart.

4. The method of claim 1, wherein, in response to determining that reboot of the information handling system is in response to an operating system failure, the method further comprises:

reserving the first portion at a second location in the segment, wherein the second location is different from the first location;

re-determining the size of the first portion;

re-determining the size of the second portion based upon the re-determined size of the first portion; and determining an allocation of a fourth portion of the segment for the first EFI type memory access, the fourth portion including the relocated first portion and the re-determined second portion;

storing a second memory map, the second memory map including the fourth portion; and passing the first memory map to the operating system.

5. The method of claim 4, wherein the re-determining the size of the second portion is based on a number of times that the operating system has had a memory map conflict.

6. The method of claim 5, wherein the number of times that the operating system has had a memory map conflict is maintained in a failure counter.

7. The method of claim 4, wherein the operating system failure is in response to the operating system writing to the third portion.

8. The method of claim 1, wherein the size of the second portion is determined as a percentage of the size of the first portion.

9. A non-transitory computer-readable medium including code for performing a method, the method comprising:

booting an information handling system;

providing a segment of a memory of the information handling system for a first extensible firmware interface type memory access;

reserving a first portion of the segment at a first location in the segment, the first portion being reserved from access by an operating system (OS) of the information handling system, and being reserved for the use of a pre-OS agent of the EFI;

determining a size of the first portion;

determining a size of a second portion of the segment based upon the size of the first portion;

allocating a third portion of the segment for the first EFI type memory access, the third portion including the first portion and the second portion;

passing a first memory map to the operating system, the first memory map including the third portion, wherein the third portion is reserved from access by the operating system;

rebooting the information handling system;

determining that in rebooting the information handling system, the allocation of the third portion is locked;

in response to determining that the allocation of the third portion is locked:

determining that the reboot of the information handling system is not in response to an operating system failure; and passing the first memory map to the operating system in response to determining that the reboot of the information handling system is not in response to an operating system failure; and in response to determining that the reboot of the information handling system is in response to an operating system failure:

reserving the first portion at a second location in the segment, wherein the second location is different from the first location;

re-determining the size of the first portion;

re-determining the size of the second portion based upon the re-determined size of the first portion;

determining an allocation of a fourth portion of the segment for the first EFI type memory access, the fourth portion including the relocated first portion and the re-determined second portion;

storing a second memory map, the second memory map including the fourth portion; and passing the first memory map to the operating system.

10. The computer-readable medium of claim 9, wherein, in response to rebooting the information handling system, the method further comprises:

determining that in rebooting the information handling system, it is safe to reallocate the third portion.

11. The computer-readable medium of claim 9, wherein the re-determining size of the second portion is based on a number of times that the operating system has failed.

12. The computer-readable medium of claim 9, wherein the operating system failure is in response to the operating system writing to the third portion.

13. An information handling system comprising:

a memory including an extensible firmware interface (EFI); and a processor to execute the EFI to:

boot the information handling system;

provide a segment of the memory for a first EFI type memory access;

reserve a first portion of the segment at a first location in the segment, the first portion being reserved from access by an operating system (OS) of the information handling system, and being reserved for the use of a pre-OS agent of the EFI;

determine a size of the first portion;

determine a size of a second portion of the segment based upon the size of the first portion;

allocate a third portion of the segment for the first EFI type memory access, the third portion including the first portion and the second portion;

pass a first memory map to the operating system, the first memory map including the third portion, wherein the third portion is reserved from access by the operating system; and reboot the information handling system;

determine that in rebooting the information handling system, the allocation of the third portion is locked; and in response to determining that the allocation of the third portion is locked:
- determine that the reboot of the information handling system is not in response to an operating system failure;
- pass the first memory map to the operating system in response to determining that the reboot of the information handling system is not in response to an operating system failure; and
- determine that the reboot of the information handling system is in response to an operating system failure.

14. The information handling system of claim 13, wherein, in response to rebooting the information handling system, a processor is further to execute the EFI to:

determine that in rebooting the information handling system, it is safe to reallocate the third portion.

* * * * *